US012809437B1

(12) United States Patent
Cheng et al.

(10) Patent No.: US 12,809,437 B1
(45) Date of Patent: Nov. 24, 2026

(54) CIRCUITS FOR SHARED PERIPHERAL MODULE SWITCHING AND STABLE POWER CONTROL IN AN ELECTRONIC DEVICE

(71) Applicant: Geotab Inc., Oakville (CA)

(72) Inventors: Jonathan Yun-Lun Cheng, Mississauga (CA); Ziying Chen, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/569,308

(22) Filed: Mar. 17, 2026

Related U.S. Application Data

(60) Provisional application No. 63/996,542, filed on Mar. 4, 2026.

(51) Int. Cl.
*G06F 1/26* (2006.01)

(52) U.S. Cl.
CPC .............. *G06F 1/266* (2013.01); *G06F 1/263* (2013.01)

(58) Field of Classification Search
CPC .......................................................... G06F 1/26
See application file for complete search history.

(56) References Cited

U.S. PATENT DOCUMENTS 6,512,465 B2 1/2003 Flick
6,741,187 B2 5/2004 Flick
6,744,384 B2 6/2004 Flick
6,756,885 B1 6/2004 Flick
6,784,809 B2 8/2004 Flick
6,798,356 B2 9/2004 Flick
6,803,861 B2 10/2004 Flick
6,888,495 B2 5/2005 Flick
6,957,133 B1 10/2005 Hunt et al.
6,972,667 B2 12/2005 Flick
7,257,396 B2 8/2007 Olsen et al.
7,647,147 B2 1/2010 Fortin et al.
7,671,727 B2 3/2010 Flick
8,032,278 B2 10/2011 Flick
9,754,426 B2 9/2017 Meyer et al.
9,886,800 B2 2/2018 Groß
(Continued)

FOREIGN PATENT DOCUMENTS

CN 207475579 U 6/2018
CN 109960677 A 7/2019
(Continued)

*Primary Examiner* — Phil K Nguyen
(74) *Attorney, Agent, or Firm* — Sheriff Abdel-Kader

(57) ABSTRACT

A circuit for sharing an internal peripheral module between a controller and a removable peripheral module in electronic devices are described. The circuit includes a data-path switch with a bias network responsive to a removable-peripheral supply voltage for stable signal routing, and a load switch controlled by a logic network to manage power delivery. In some implementations, the load switch is governed by the logic network to eliminate undefined states, thereby enabling programming or diagnostics via the removable module without requiring full system power-up. In other implementations, this hardware-based solution ensures reliable switching, reduces overall power consumption, and supports applications such as USB-based embedded systems and production test fixtures.

11 Claims, 10 Drawing Sheets

(56) References Cited

U.S. PATENT DOCUMENTS

| | | | | |
|---|---|---|---|---|
| 10,255,575 | B2 | 4/2019 | Warkentin et al. | |
| 11,140,236 | B2 | 10/2021 | Davis et al. | |
| 11,310,069 | B2 | 4/2022 | Xiao et al. | |
| 11,542,001 | B1 | 1/2023 | Parodi et al. | |
| 11,710,355 | B1 | 7/2023 | Wenneman et al. | |
| 11,736,312 | B1 | 8/2023 | Xiao et al. | |
| 11,741,760 | B1 | 8/2023 | Dubin et al. | |
| 11,756,346 | B1 | 9/2023 | Wu et al. | |
| 11,780,446 | B1 | 10/2023 | Srinivasan et al. | |
| 11,787,413 | B2 | 10/2023 | Tsai et al. | |
| 11,847,911 | B2 | 12/2023 | Eihattab et al. | |
| 2008/0301487 | A1* | 12/2008 | Hatta | G06F 11/1484 714/E11.071 |
| 2009/0044028 | A1* | 2/2009 | Wong | G06F 1/266 713/300 |
| 2009/0307390 | A1* | 12/2009 | Bennett | G06F 1/266 710/36 |
| 2013/0187457 | A1* | 7/2013 | Schlichter | G06F 1/266 307/31 |
| 2014/0089713 | A1* | 3/2014 | Hsiao | G06F 1/3287 713/300 |
| 2016/0171259 | A1* | 6/2016 | Kaechi | G06K 7/10158 340/10.34 |
| 2017/0336844 | A1* | 11/2017 | Koga | G06F 1/20 |
| 2018/0182182 | A1 | 6/2018 | Meyer et al. | |
| 2019/0227609 | A1* | 7/2019 | Koshigaya | G06F 1/266 |
| 2021/0223838 | A1* | 7/2021 | Yeh | G06F 1/266 |
| 2022/0014601 | A1 | 1/2022 | Davis et al. | |
| 2022/0044500 | A1 | 2/2022 | Yang et al. | |
| 2022/0237958 | A1 | 7/2022 | Tzamaloukas et al. | |
| 2023/0171314 | A1 | 6/2023 | Onti Srinivasan et al. | |

FOREIGN PATENT DOCUMENTS

| | | | |
|---|---|---|---|
| CN | 106877103 | B | 10/2019 |
| CN | 217113272 | U | 8/2022 |
| KR | 20110092940 | A | 8/2011 |

* cited by examiner

600

| Peripheral Enable | Removable Peripheral Module | Internal Peripheral Module |
|---|---|---|
| LOW | Not Inserted | OFF |
| HIGH | Not Inserted | ON |
| LOW | Inserted | ON |
| HIGH | Inserted | ON |

CIRCUITS FOR SHARED PERIPHERAL MODULE SWITCHING AND STABLE POWER CONTROL IN AN ELECTRONIC DEVICE

RELATED APPLICATIONS

This application claims priority from U.S. provisional application 63/996,542 filed Mar. 4, 2026, the contents of which are herein incorporated by reference in their entirety.

FIELD

This disclosure relates generally to shared-port peripheral interfaces and power control in electronic devices, and more specifically to circuits for shared peripheral module switching and stable power control in an electronic device.

BACKGROUND

In modern electronic systems, the use of a single peripheral interface, such as a USB port, is becoming increasingly common for both an onboard controller and an external device or fixture. This requirement arises in applications where space, cost, or design constraints restrict the number of available ports, while both in-system operation and external access for programming, diagnostics, or servicing are necessary to support. Existing solutions for sharing a peripheral between multiple hosts can encounter reliability issues, undefined logic states, or increased complexity, emphasizing the importance of developing improved approaches that provide stable operation and seamless switching between internal and external connections.

SUMMARY

In one aspect of the present disclosure, there is provided a circuit for sharing an internal peripheral module of an electronic device between a controller and a removable peripheral module, the circuit comprising a data-path switch having a control input and at least two switch paths for signal lines, the data-path switch configured with common terminals coupled to signal lines of the internal peripheral module and further configured to selectively route those signal lines to either controller data lines or removable-peripheral data lines, wherein the control input of the data-path switch is coupled to a bias network that sets a logic state at the control input as a function of a removable-peripheral supply voltage, and wherein the data-path switch routes the signal lines of the internal peripheral module to the controller or to the removable peripheral module according to the logic state at the control input, and a peripheral power switching subsystem comprising a load switch having an input terminal coupled to a voltage supply, an output terminal coupled to a switched internal peripheral supply voltage, and a control terminal, wherein the control terminal of the load switch is coupled to a logic network responsive to at least two sources including the removable-peripheral supply voltage and a controller-side peripheral enable signal such that the load switch presents the voltage supply at the output terminal when at least one of (i) the controller-side peripheral enable signal is asserted or (ii) the removable-peripheral supply voltage is above a threshold indicative of presence of the removable peripheral module. This improves stability of shared-port routing while ensuring the internal peripheral module is powered when either normal operation or fixture presence requires it.

The data-path switch may further comprise a first set of throw terminals coupled to the controller data lines and a second set of throw terminals coupled to the removable-peripheral data lines. The data-path switch may be configured to concurrently connect the common terminals to one of the first set of throw terminals or the second set of throw terminals. This secures coordinated switching of associated signal lines and reduces the risk of partial or inconsistent routing.

The bias network may comprise a voltage divider connected between the removable-peripheral supply voltage and ground, with a center node of the voltage divider coupled to the control input of the data-path switch to set the logic state at the control input. This ensures deterministic selection behavior driven by fixture presence.

A resistance ratio of the voltage divider may be selected to maintain the control input below an input-low threshold when the removable-peripheral supply voltage is absent. This reduces susceptibility to floating or mid-rail control states.

The logic network may comprise a one-way isolation element coupling the controller-side peripheral enable signal to the control terminal and a coupling network coupling the removable-peripheral supply voltage to the control terminal. This enables robust OR-type enablement without back feeding between domains.

The one-way isolation element may comprise a Schottky diode configured to prevent reverse current from the removable-peripheral supply voltage toward a controller domain. This protects the controller domain and improves electrical isolation.

The coupling network may have an impedance selected to limit leakage from the removable-peripheral supply voltage while maintaining a valid enable level at the control terminal. This improves reliability while reducing unwanted current draw and back feed paths. In an absence of the removable-peripheral supply voltage, the bias network may set a logic state at the control input corresponding to a default state in which the data-path switch routes the signal lines of the internal peripheral module to the controller. This ensures predictable behavior when the removable peripheral module is not present.

When the removable-peripheral supply voltage is above the threshold indicative of presence of the removable peripheral module, the data-path switch may disconnect the controller data lines from the signal lines of the internal peripheral module while routing the signal lines of the internal peripheral module to the removable-peripheral data lines. This prevents simultaneous driving and improves signal integrity during programming or diagnostics.

The bias network and the logic network may implement a state behavior in which, when the removable-peripheral supply voltage is above the threshold indicative of presence of the removable peripheral module, the data-path switch routes the signal lines of the internal peripheral module to the removable-peripheral data lines, when the removable-peripheral supply voltage is below the threshold, the data-path switch routes the signal lines of the internal peripheral module to the controller data lines, and the load switch presents the voltage supply at the output terminal when at least one of (i) the controller-side peripheral enable signal is asserted or (ii) the removable-peripheral supply voltage is above the threshold indicative of presence of the removable peripheral module. This provides predictable, end-to-end operating behavior across the relevant connection states.

The internal peripheral module may comprise a USB module and the signal lines may comprise USB differential data lines D+ and D−, and the removable-peripheral supply voltage may comprise a fixture-side USB voltage bus. This provides explicit coverage for USB implementations used in production and field service.

In another aspect of the present disclosure, there is provided a circuit for enabling a switched internal peripheral supply voltage of an electronic module, the circuit comprising a load switch having an input terminal coupled to a voltage supply, an output terminal coupled to the switched internal peripheral supply voltage, and a control terminal, and a logic network coupled to the control terminal and configured to drive the control terminal in response to at least two sources including a removable-peripheral supply voltage and a controller-side peripheral enable signal, wherein the load switch is configured to pass the voltage supply from the input terminal to the output terminal when at least one of (i) the controller-side peripheral enable signal is asserted or (ii) the removable-peripheral supply voltage is above a threshold indicative of presence of a removable peripheral module, and the logic network comprises a one-way isolation element coupling the controller-side peripheral enable signal to the control terminal and a high-impedance coupling network coupling the removable-peripheral supply voltage to the control terminal. This ensures the peripheral can be powered under either controller request or fixture presence while protecting the controller domain.

The high-impedance coupling network may comprise a voltage divider connected between the removable-peripheral supply voltage and ground, and a center node of the voltage divider may be coupled to the control terminal. This ensures a defined control level derived from fixture voltage while limiting current draw.

The one-way isolation element may comprise a Schottky diode. This improves isolation with a low forward drop suitable for logic coupling.

The high-impedance coupling network may comprise a resistor coupling the removable-peripheral supply voltage to the control terminal. This provides a low-cost implementation with controlled leakage.

The logic network may further comprise a pull-down resistor coupled between the control terminal and ground to define a de-asserted state of the control terminal when the removable-peripheral supply voltage is below the threshold, and the controller-side peripheral enable signal is de-asserted. This ensures a deterministic off state and avoids an indeterminate enable node.

The one-way isolation element may be arranged to prevent reverse current from the removable-peripheral supply voltage into a controller domain associated with the controller-side peripheral enable signal. This reduces the risk of unintended powering of the controller domain.

The controller-side peripheral enable signal may have a voltage level less than the switched internal peripheral supply voltage. The load switch may level-shift the controller-side peripheral enable signal to enable delivery of the voltage supply at the output terminal. This enables use of low-voltage control logic to gate higher-voltage peripheral supplies.

In yet another aspect of the present disclosure, there is provided a circuit for deterministic control of a data-path switch in a shared-port architecture, the circuit comprising a data-path switch having a control input and at least two switch paths for signal lines, the data-path switch configured with common terminals coupled to signal lines of an internal peripheral module of an electronic device and further configured to selectively route those signal lines to either controller data lines or removable-peripheral data lines, and a bias network coupled to the control input and responsive to a removable-peripheral supply voltage, wherein the bias network sets a logic state at the control input as a function of the removable-peripheral supply voltage, and the data-path switch routes the signal lines of the internal peripheral module to the controller or to the removable peripheral module according to the logic state at the control input, and wherein the bias network includes a voltage-dividing element with resistor values and ratios selected such that, in a condition where the removable-peripheral supply voltage is absent and a controller-side peripheral enable signal is asserted, a voltage at the control input is held below an input-low threshold of the data-path switch, thereby eliminating mid-rail states and preventing unstable switching behavior. This directly addresses undefined control-pin states that can cause intermittent disconnects.

In an absence of the removable-peripheral supply voltage, the bias network may set the logic state at the control input to cause the data-path switch to route the signal lines of the internal peripheral module to the controller as a default state. This ensures predictable routing when no fixture is present.

In a further aspect of the present disclosure, there is provided a method of sharing an internal peripheral module of an electronic device between a controller and a removable peripheral module, the method comprising routing, by a data-path switch, signal lines of the internal peripheral module to either controller data lines or removable-peripheral data lines, setting, by a bias network coupled to a control input of the data-path switch, a logic state at the control input as a function of a removable-peripheral supply voltage such that the data-path switch routes the signal lines of the internal peripheral module to the controller or to the removable peripheral module according to the logic state at the control input, and enabling a load switch to pass a voltage supply to a switched internal peripheral supply voltage by driving a control terminal through a logic network responsive to at least two sources including the removable-peripheral supply voltage and a controller-side peripheral enable signal, such that the load switch presents the voltage supply at an output terminal when at least one of (i) the controller-side peripheral enable signal is asserted or (ii) the removable-peripheral supply voltage is above a threshold indicative of presence of the removable peripheral module. This improves operational stability while supporting both normal operation and fixture-based access. The method for sharing an internal peripheral module of an electronic device between a controller and a removable peripheral module may further comprise selecting resistor values and ratios of a voltage-dividing element in the bias network such that, in a condition where the removable-peripheral supply voltage is absent and the controller-side peripheral enable signal is asserted, a voltage at the control input remains below an input-low threshold. This prevents mid-rail states and unstable switching.

The method for sharing an internal peripheral module of an electronic device between a controller and a removable peripheral module may further comprise, in an absence of the removable-peripheral supply voltage, setting the logic state at the control input to cause the data-path switch to route the signal lines of the internal peripheral module to the controller as a default state. This ensures deterministic behavior when the removable peripheral module is not present.

The method for sharing an internal peripheral module of an electronic device between a controller and a removable peripheral module may further comprise preventing reverse current from the removable-peripheral supply voltage into a path of the controller-side peripheral enable signal by orienting a diode in the logic network to block current from the removable-peripheral supply voltage toward a controller domain and by coupling the removable-peripheral supply voltage to the control terminal through a coupling network. This reduces back feeding and protects low-voltage control circuitry.

The method for sharing an internal peripheral module of an electronic device between a controller and a removable peripheral module may further comprise performing programming or diagnostics of the internal peripheral module via the removable peripheral module while the controller is unpowered or in a reduced-power state, with the load switch supplying the switched internal peripheral supply voltage in response to at least one of (i) the controller-side peripheral enable signal being asserted or (ii) the removable-peripheral supply voltage being above the threshold indicative of presence of the removable peripheral module. This improves production throughput and serviceability without requiring full system power-up.

The method for sharing an internal peripheral module of an electronic device between a controller and a removable peripheral module may further comprise asserting the controller-side peripheral enable signal while the removable-peripheral supply voltage is absent and driving the control input to exceed an input-high threshold of the data-path switch through the bias network. This ensures valid routing selection even in the fixture-absent, controller-asserted corner case.

The method for sharing an internal peripheral module of an electronic device between a controller and a removable peripheral module may further comprise choosing resistor values and ratios of the bias network such that, with the controller-side peripheral enable signal at approximately 3.3 volts, a resulting bias voltage at the control input is at least the input-high threshold of the data-path switch. This ensures robust logic margin despite diode drops and leakage paths.

DETAILED DESCRIPTION

Figure 1:
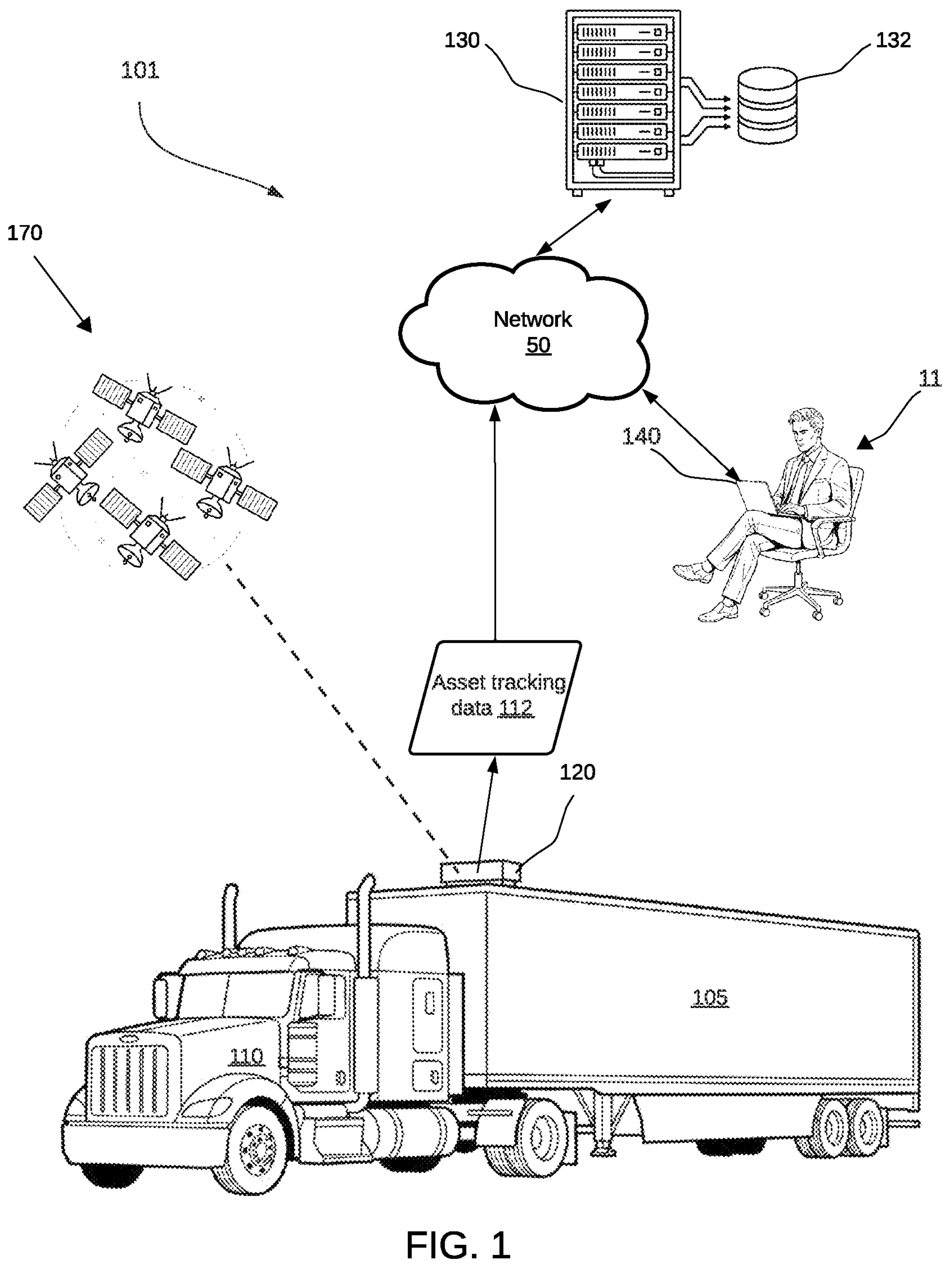
FIG. 1 is a system diagram illustrating an asset tracking system for monitoring and managing assets using networked components.

The following detailed description provides illustrative examples of the disclosed subject matter and various embodiments. The examples and descriptions provided herein are for explanatory purposes and are not intended to limit the scope of the disclosed subject matter. The disclosed subject matter may be represented in many different forms and is not to be construed as being limited to the specific examples or configurations disclosed. Rather, the scope of the disclosed subject matter is defined by the appended claims and their equivalents.

The described subject matter generally pertains to the field of electronic devices, specifically to methods and circuits for managing shared peripheral interfaces and stable power control. While the description includes specific details to provide a comprehensive understanding of the disclosed subject matter, certain well-known components, protocols, and techniques may not be described in detail to avoid obscuring the disclosed subject matter. Furthermore, various modifications, substitutions, and rearrangements of components or steps may be made without departing from the spirit and scope of the subject matter as defined in the claims.

In this disclosure "electronic module" refers to an electronic assembly that includes at least one peripheral module and associated circuitry, which may be part of a larger device or system.

In this disclosure "electronic device" refers to a host product that incorporates the electronic module and other subsystems, such as a telematics unit, asset tracker, or embedded controller.

In this disclosure "internal peripheral module" refers to a peripheral module permanently or semi-permanently integrated within the electronic device (for example, a modem card or on-board transceiver).

In this disclosure "removable peripheral module" refers to an external or detachable fixture or module (for example, a production test fixture, programming jig, or service interface) that can be selectively coupled to the device.

In this disclosure "controller" refers to a control element such as a microcontroller unit (MCU), application processor (AP), system-on-chip (SoC), programmable logic device, or equivalent controller capable of asserting control signals and processing data.

In this disclosure "data lines" refers to one or more signal conductors that carry data between the peripheral module and other subsystems. They may be differential pairs (e.g., D+/D−) or single-ended signals, depending on the interface.

In this disclosure "data-path switch" refers to a switching element that selectively routes the data lines between different endpoints (for example, a DPDT high-speed analog switch or functionally equivalent multiplexer capable of switching plural lines concurrently).

In this disclosure, for a data path switch "control input" refers to the control terminal or pin of the data-path switch that determines which set of data lines is selected. For a load switch, "control input" refers to the control terminal or pin of the load switch that routes a voltage signal at an input voltage terminal to an output voltage terminal.

In this disclosure "bias network" refers to circuitry that sets a deterministic voltage at the control input of the data-path switch in response to one or more sources, and may include a voltage divider, pull-ups, pull-downs, and/or isolation elements.

In this disclosure "voltage divider" refers to two or more resistors arranged to establish a defined fraction of an input voltage at a node, used to generate a stable logic level for a control input.

In this disclosure "input-low threshold" and "input-high threshold" refer to the logic-level boundaries specified for a control input (e.g., VIL and VIH) such that voltages below VIL are interpreted as logic-low and voltages at or above VIH are interpreted as logic-high.

In this disclosure "logic network" refers to circuitry that combines two or more sources to assert an enable or control signal, and may include diodes, resistors, inverters, and other elements to provide one-way isolation and leakage-limited coupling.

In this disclosure "one-way isolation element" refers to a component that allows current flow in only one direction to prevent back feed (for example, a diode, preferably a Schottky diode with low forward voltage).

In this disclosure "load switch" refers to a power-switching device (integrated IC or discrete transistor with gate control) having an input, an output, and a control terminal, used to connect a voltage supply to a load in response to a control signal.

In this disclosure "switched internal peripheral supply voltage" refers to the supply provided by the load switch to power or enable the internal peripheral module.

In this disclosure "controller-side peripheral enable signal" refers to a control signal generated by the controller requesting that the internal peripheral module be powered or enabled.

In this disclosure "removable-peripheral supply voltage" refers to a voltage indicative of the presence or power of a removable peripheral module or fixture (for example, a fixture-side USB VBUS).

In this disclosure "simultaneous routing of plural signal lines" refers to switching two or more associated data lines together in a coordinated manner to maintain interface integrity (for example, switching both conductors of a differential pair).

In this disclosure "default state" refers to the routing and power configuration that is automatically selected when the removable-peripheral supply voltage is absent and no contrary control is asserted.

In this disclosure "test fixture" or "fixture" refers to an external apparatus used for manufacturing, programming, diagnostics, or service access that can provide data connectivity and/or a supply voltage to the electronic device.

In this disclosure "programming or diagnostics via the removable peripheral module" refers to communicating with or configuring the peripheral module through the removable fixture while the controller is unpowered or in a reduced-power state.

In modern electronic systems, particularly in embedded devices such as telematics units and asset trackers, a single internal peripheral, such as a wireless modem or network interface, may be required to connect to an internal component such as a controller and to an external peripheral. Often such internal peripherals may have a single internal peripheral interface—such as a USB port. As such, the single internal peripheral interface is often required to serve dual purposes: communication with an onboard microcontroller unit (MCU) or application processor (AP) during typical operation, and interfacing with an external programming or diagnostic fixture during production or servicing.

One significant issue arises when the external fixture is disconnected, leaving the switch control pin in an ambiguous state—neither distinctly high nor low. This uncertainty can result in mid-rail voltages that cause the switch to behave unpredictably, severing the connection between the internal peripheral module and the MCU. Additionally, some designs often fail to provide dependable power control for the internal peripheral module, particularly when transitioning between the external fixture and the controller as active hosts. These shortcomings not only undermine the stability of peripheral communication but also impede production efficiency, as the internal peripheral module cannot be consistently programmed or diagnosed without powering on the entire device.

The present circuit architecture addresses these limitations through a design that combines a high-speed data-path switch with a load switch controlled by a logic network responsive to at least two sources. Stable operation is achieved by coupling a control input of the data-path switch to a bias network that sets a deterministic logic state at the control input as a function of a removable-peripheral supply voltage, thereby eliminating floating or mid-rail conditions. The load switch is driven by the logic network in response to a controller-side peripheral enable signal and the removable-peripheral supply voltage such that the load switch presents a voltage supply to a switched internal peripheral supply voltage when at least one of (i) the controller-side peripheral enable signal is asserted or (ii) the removable-peripheral supply voltage is above a threshold indicative of presence of the removable peripheral module. In some implementations, the logic network implements the foregoing behavior using a diode-resistor arrangement that provides one-way isolation between a controller domain and a removable-peripheral domain. This configuration enables the internal peripheral module to be powered during normal device operation and also permits programming or diagnostics via the removable peripheral module without requiring the controller to be fully powered.

By addressing the root causes of instability and introducing robust power and signal routing mechanisms, the described system significantly improves the reliability of shared peripheral module architectures. The system eliminates field failures caused by undefined control states, enhances production workflows by enabling independent programming of the internal peripheral module, and achieves these benefits using cost-effective, discrete components. This approach not only resolves the technical challenges of prior designs but also provides a scalable and manufacturable solution for next-generation embedded systems.

One non-limiting example of the electronic device discussed in this disclosure, is an asset tracker. An asset tracker is an electronic device used to monitor the location and status of various assets. An asset may be a vehicle, a piece of equipment, a shipping container, a trailer, a tank, or any other type of asset whose location and condition need to be tracked. An asset tracker is typically part of an asset tracking system such as the asset tracking system 101 depicted in FIG. 1.

FIG. 1 illustrates an asset tracking system 101 configured to monitor and manage the assets 100, in accordance with embodiments of the present disclosure. The asset tracking system 101 includes an asset tracker 120, an asset tracking server 130, an asset tracking database 132, a network 50, an administration terminal 140, and satellites 170. In operation, the asset tracking system 101 is configured to collect, transmit, and analyze the asset tracking data 112 to provide real-time information regarding the location, movement, and condition of an asset 100.

As depicted in FIG. 1, the asset 100 comprises a trailer 105 coupled to a tractor 110. The asset tracker 120 is installed on the trailer 105 and is responsible for collecting and transmitting the asset tracking data 112. First, the asset tracker 120 communicates with satellites 170, which form part of a Global Navigation Satellite System (GNSS) such as GPS, GLONASS, Galileo, or BeiDou. Accordingly, these satellites 170 provide location data to the asset tracker 120, thereby enabling precise tracking of the asset 100.

Next, the asset tracker 120 transmits the collected asset tracking data 112 to the asset tracking server 130 via the network 50. The network 50 serves as the communication backbone of the asset tracking system 101 and may include various technologies such as cellular networks (e.g., 2G, 3G, 4G, 5G, or NB-IoT), non-cellular wide-area networks (e.g., LoRaWAN), local wireless technology such as WiFi or wired technologies (e.g., Ethernet). As a result, the network 50 facilitates reliable data transmission between the asset tracker 120 and the asset tracking server 130.

The asset tracking server 130 is implemented as an electronic device or a cluster of devices responsible for receiving, processing, and storing the asset tracking data 112. The server aggregates and analyzes the data to generate actionable insights and stores these results in the asset tracking database 132. The asset tracking database 132 thus serves as a repository for processed data and analytics, enabling efficient data retrieval and management.

The administration terminal 140 is an electronic device, such as a laptop, desktop, or smartphone, used by an administrator 11 to interact with the asset tracking system 101. In some implementations, the administration terminal 140 connects to the asset tracking server 130 via the network 50, allowing the administrator 11 to access the asset tracking data 112, configure alerts, set geofences, and issue commands to the asset tracker 120. For example, notifications and alerts—such as when an asset moves outside a predefined area—are sent from the asset tracking server 130 to the administration terminal 140.

Accordingly, the integration of satellites 170, the asset tracker 120, the network 50, the asset tracking server 130, and the administration terminal 140 enables the asset tracking system 101 to provide comprehensive monitoring and management of assets 100. This system is particularly useful for tracking diverse assets, including vehicles, shipping containers, and industrial equipment, across various environments and transportation modes.

Another non-limiting example of the electronic device discussed in this disclosure is a telematics device. A telematics device is an electronic device that combines telecommunications and informatics to collect and transmit data, often used in vehicles to monitor location, speed, engine health, and driver behavior. A telematics device is typically part of a telematics system such as the telematics system 201 depicted in FIG. 2. A telematics system integrates telecommunications and informatics to monitor and manage remote assets, including vehicles and other equipment, collecting data from a high number of assets either directly or through telematics devices.

Figure 2:
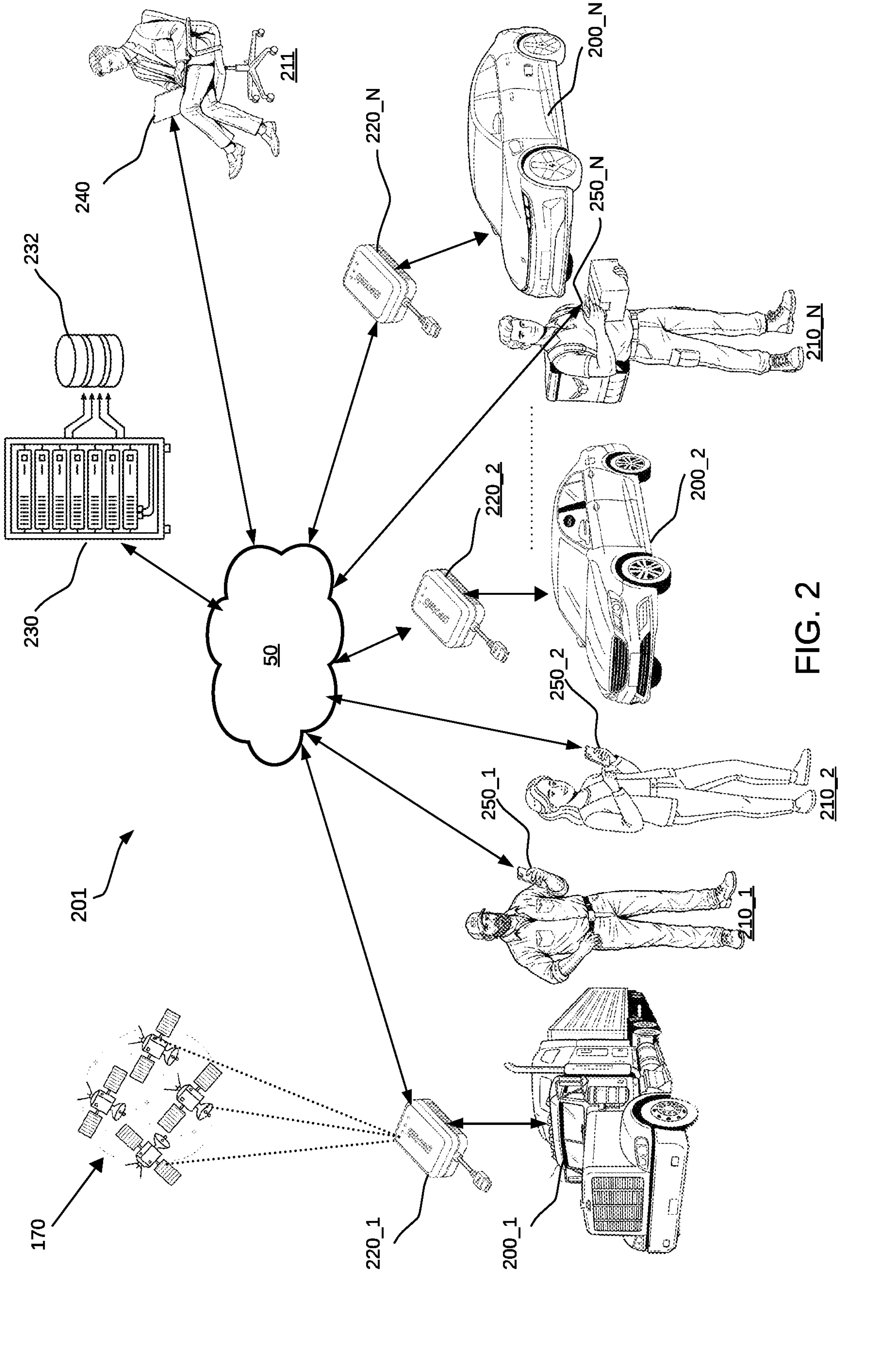
FIG. 2 is a system diagram illustrating a telematics system for monitoring and managing multiple assets and users via networked telematics devices.

FIG. 2 depicts a telematics system 201 configured to monitor and manage a plurality of assets 200 (e.g., asset 200_1, asset 200_2, through asset 200_N), in accordance with embodiments of the present disclosure. When deployed, the telematics system 201 integrates various components including telematics devices 220 (e.g., 220_1, 220_2, through 220_N), a telematics server 230, a telematics database 232, a network 50, an administration terminal 240, operator terminals 250 (e.g., 250_1, 250_2, through 250_N), and satellites 170. Accordingly, the system enables the collection, transmission, and analysis of telematics data to provide real-time information about the location, performance, and operational status of the assets 200 (e.g., asset 200_1, asset 200_2, through asset 200_N).

In operation, each asset 200 (e.g., asset 200_1, asset 200_2, through asset 200_N) is equipped with a corresponding telematics device 220 (e.g., telematics device 220_1, telematics device 220_2, through telematics device 220_N). First, the telematics devices 220 collect data from the assets 200 (e.g., 200_1, 200_2, through 200_N), which may include location data, performance metrics, and sensor data. The telematics devices 220 communicate with satellites 170, which form part of a Global Navigation Satellite System (GNSS) such as GPS, GLONASS, Galileo, or BeiDou. As a result, the satellites 170 provide precise location data to the telematics devices 220, thereby enabling accurate tracking of the assets 200 (e.g., 200_1, 200_2, through 200_N).

Subsequently, the telematics devices 220 transmit the collected telematics data to the telematics server 230 via the network 50. The network 50 serves as the communication backbone of the telematics system 201 and may include cellular networks (e.g., 2G, 3G, 4G, 5G, or NB-IoT), non-cellular wide-area networks (e.g., LoRaWAN or WiMAX), or wired technologies (e.g., Ethernet). The network 50 facilitates reliable data transmission between the telematics devices 220, the telematics server 230, and other system components.

The telematics server 230 is a computer system, or a cluster of devices, responsible for receiving, processing, and storing the telematics data. Specifically, the server 230 aggregates and analyzes the data to generate actionable insights, which are stored in the telematics database 232. Accordingly, the telematics database 232 serves as a repository for processed data and analytics, enabling efficient data retrieval and management.

In some implementations, a fleet manager 211 uses the administration terminal 240 to interact with the telematics system 201. For example, the administration terminal 240 connects to the telematics server 230 via the network 50, allowing the fleet manager 211 to access telematics data, configure alerts, set geofences, and issue commands to the telematics devices 220. When a predefined alert condition is met (e.g., an asset 200 moves outside a predefined area), the telematics server 230 sends a notification to the administration terminal 240.

Furthermore, operators 210 (e.g., the operator 210_1, the operator 210_2, through the operator 210_N) use the operator terminals 250 (e.g., the operator terminal 250_1, the operator terminal 250_2, through the operator terminal 250_N) to track and configure asset usage. The operator terminals 250, which may include smartphones or other portable devices, enable the operators 210 to report operational data, configure the telematics devices 220, and receive alerts or notifications from the telematics server 230.

The telematics system 201 offers a thorough approach for monitoring and managing the assets 200 (e.g., the asset 200_1, the asset 200_2, through the asset 200_N) across diverse environments and transportation modes. The integration of telematics devices 220 (e.g., the telematics device

220_1, the telematics device 220_2, through the telematics device 220_N), satellites 170, the network 50, the telematics server 230, the telematics database 232, the administration terminal 240, and the operator terminals 250 (e.g., 250_1, 250_2, through 250_N) facilitates seamless data collection, transmission, and analysis. As a result, fleet managers 211 and operators 210 (e.g., 210_1, 210_2, through 210_N) are able to make informed decisions, improve asset utilization, and boost operational efficiency.

Figure 3:
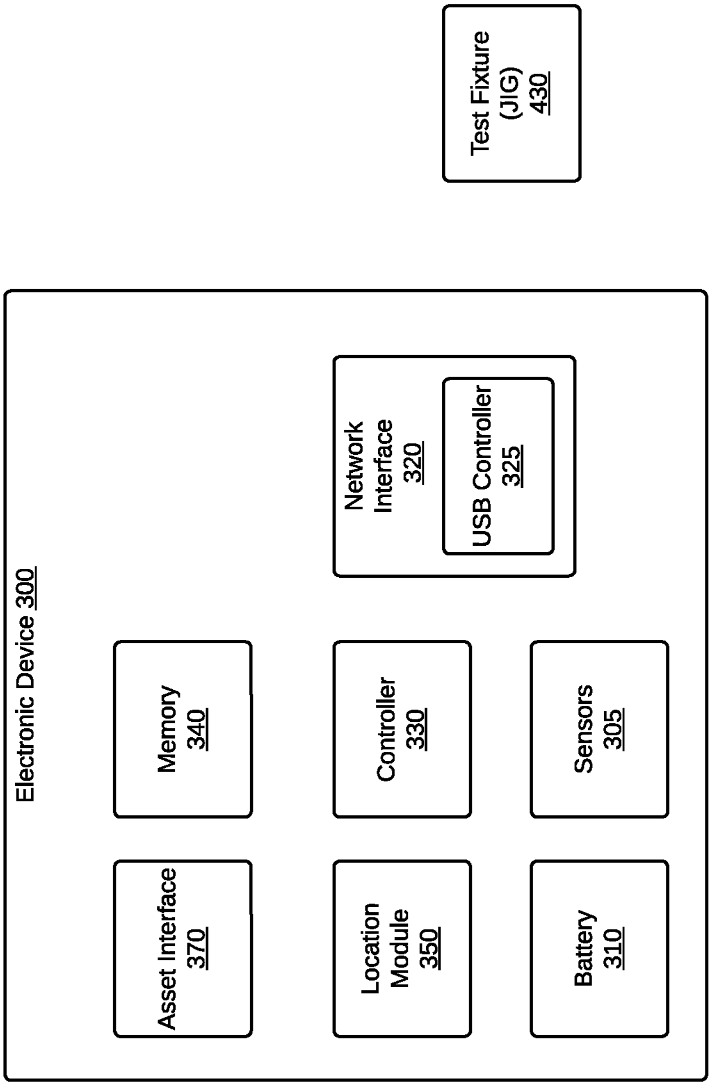
FIG. 3 is a block diagram illustrating the components and interconnections of an electronic device and a test fixture.

FIG. 3 is a block diagram illustrating the components and interconnections of an electronic device 300. The electronic device 300 includes a controller 330, memory 340, network interface 320, sensors 305, asset interface 370, and battery 310. The controller 330 is connected to the memory 340, network interface 320, sensors 305, and asset interface 370. The network interface 320 includes a USB controller 325. Also shown in FIG. 3 is a test fixture 430, also known as a jig.

The battery 310 powers the electronic device 300 and is typically a non-rechargeable type, such as Li—SOCl2 or Li—MnO2, both offering high energy density and wide operating temperature ranges. Li—SOCl2 batteries provide long shelf life and stable voltage, while Li—MnO2 batteries feature low self-discharge. In some cases, the device may not include a built-in battery and instead operate on external power from an asset battery. In some cases the battery is a rechargeable battery that gets recharged from the asset battery.

Memory 340 is an electronic storage component for storing data and machine-executable programming instructions. Memory 340 may be ROM (PROM, EPROM, EEPROM, or Flash), RAM (SRAM and DRAM), FRAM, MRAM, or PCM, or any combination. Memory 340 stores machine-executable programming instructions and/or data to support functionality. Memory 340 is coupled to controller 330 via a bus, enabling the controller 330 to execute instructions and/or access data.

The asset interface 370 is a component of the electronic device 300 that enables the device to capture data from connected assets. It serves as a communication bridge between the electronic device and the asset, allowing the controller 330 to receive asset-specific information such as operational status, sensor readings, or diagnostic data. The asset interface 370 may support various physical connections and communication protocols, ensuring compatibility with a wide range of asset types.

The controller 330 can be any combination of processors (processor, microprocessor, MCU, CPU, SOC, processing core), state machines, logic gate arrays, ASICs, FPGAs, or other hardware capable of executing instructions. It may use Von Neumann, Harvard, or Modified Harvard Architecture. Controller 330 can be a CISC or RISC processor, with single or multiple cores for parallel execution. It may have internal memory for storing instructions.

The sensors 305 may be one or more of: a motion sensor, a temperature sensor, a pressure sensor, an optical sensor, a humidity sensor, a gas sensor, an acoustic sensor, a pH sensor, a soil moisture sensor, or any other suitable sensor indicating a condition pertaining to the asset to which the electronic device 300 is coupled. The sensors provide sensor data to the controller 330. Some controllers 330 may have some integrated sensors. In other cases, the sensors 305 are coupled to the controller 330 using a serial interface, such as SPI, 12C, UART, USB, or SDIO.

Figure 4:
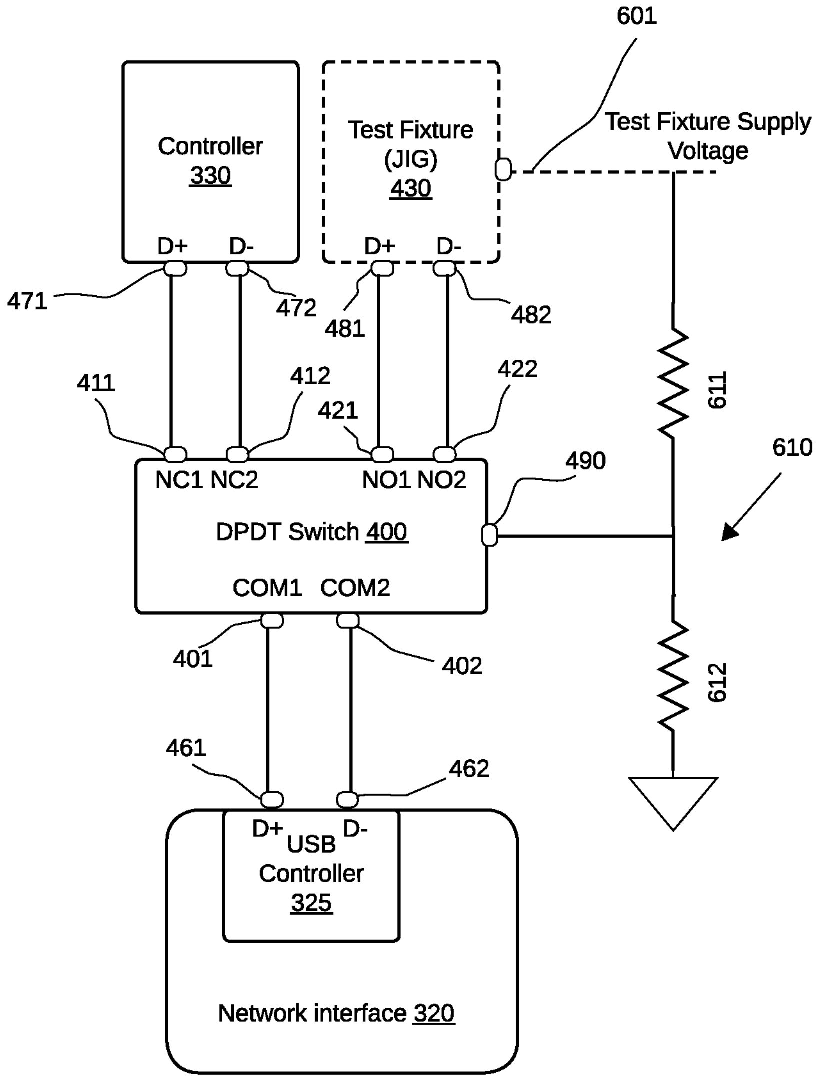
FIG. 4 is a schematic illustrating a DPDT switch for routing USB data lines between a controller and a test fixture with a voltage divider control.

The network interface 320 supports a wide range of cellular, non-cellular, and wired network technologies, enabling the electronic device 300 to transmit data to remote servers and receive configuration instructions. It may be integrated into the controller 330 or connected through various serial or parallel interfaces. The network interface 320 is responsible for sending the collected data to a remote server, such as the telematics server 230, over a suitable communication network. The network interface 320 interfaces with the controller 330 over a USB interface managed by the USB controller 325. The USB interface may also be used by the test fixture 430 to communicate with, configure, and debug, the network interface 320. In some cases, the USB controller 325 only has a single USB interface comprised of a D+ terminal and a D− terminals. FIG. 4 depicts a circuit for sharing the network interface 320 between the controller 330 and the test fixture 430.

The components shown in FIG. 4 include the controller 330, the network interface 320 including the USB controller 325, the test fixture 430, a Double Pole Double Throw (DPDT) switch 400, the removable-peripheral supply voltage 605, and the voltage divider 610 including resistors 611 and 612.

The controller 330 has been described above with reference to FIG. 3. The controller 330 is an electronic control element that exchanges data with an internal peripheral through the controller data lines 471 and 472 and may assert a controller-side peripheral enable signal (not shown in FIG. 4). The controller 330 receives data via the controller data lines 471 and 472 and transmits data on those same lines during normal operation. The controller 330 can be implemented as a microcontroller unit, an application processor, a system-on-chip, or equivalent control hardware, including commercially available devices such as STM32-class microcontrollers or other embedded controllers.

The network interface 320 is an internal peripheral module of the electronic device that communicates using USB signaling and includes the USB controller 325. The network interface 320 exchanges data with other modules using the internal peripheral signal lines 461 and 462, and those signal lines are selectively routed either to the controller 330 or to the test fixture 430. The network interface 320 can be implemented as a cellular modem module, a communications module, or another USB-based peripheral subsystem.

The USB controller 325 is circuitry within the network interface 320 that implements USB signaling over the internal peripheral signal lines 461 and 462. The USB controller 325 receives and drives USB differential signaling (or other USB data signaling) on 461 and 462 depending on which endpoint is connected through the DPDT switch 400. The USB controller 325 may be implemented as a USB device controller integrated in a modem or as a discrete USB interface controller.

The test fixture 430 is a removable module used for manufacturing, programming, diagnostics, or service. The test fixture 430 communicates with the internal peripheral, such as the network interface 320, using fixture data lines 481 and 482. The test fixture 430 provides the removable-peripheral supply voltage 605 indicative of presence of the test fixture 430. The test fixture 430 can be implemented as a USB programming jig connected to a host computer, a bed-of-nails fixture, or a service adapter.

The DPDT switch 400 is an example of the "data-path switch". The DPDT switch 400 is configured with common terminals 401 and 402 coupled to the internal peripheral signal lines 461 and 462 of the internal peripheral module (the network interface 320). The DPDT switch 400 is further configured to selectively route those signal lines to either the controller data lines 471 and 472 through the controller-side terminals 411 and 412 or to the fixture data lines 481 and 482 through terminals 421 and 422, according to a logic state at the control input 490. The DPDT switch 400 may be implemented as a high-speed analog DPDT switch suitable for USB signaling, including commercially available USB switch ICs.

The first common terminal 401 and the second common terminal 402 are the terminals of the DPDT switch 400 that are coupled to the internal peripheral signal lines 461 and 462. The first common terminal 401 and the second common terminal 402 provide the shared connection point that is alternately connected to either the controller side or the fixture side based on the logic state at the control input 490.

The controller-side terminals 411 and 412 are terminals of the DPDT switch 400 that couple the DPDT switch 400 to the controller data lines 471 and 472. When the logic state at the control input 490 selects the controller side, the DPDT switch 400 connects the common terminals 401 and 402 to the controller-side terminals 411 and 412 to route the internal peripheral signal lines 461 and 462 to the controller 330.

The fixture-side terminals 421 and 422 are terminals of the DPDT switch 400 that couple the DPDT switch 400 to the fixture data lines 481 and 482. When the logic state at the control input 490 selects the fixture side, the DPDT switch 400 connects the common terminals 401 and 402 to the fixture-side terminals 421 and 422 to route the internal peripheral signal lines 461 and 462 to the test fixture 430.

The controller data lines 471 and 472 are conductors coupled between the controller 330 and the controller-side terminals 411 and 412. The controller data lines 471 and 472 carry communications between the controller 330 and the network interface 320 when the DPDT switch 400 selects the controller side.

The fixture data lines 481 and 482 are conductors coupled between the test fixture 430 and the fixture-side terminals 421 and 422. The fixture data lines 481 and 482 carry communications between the test fixture 430 and the network interface 320 when the DPDT switch 400 selects the fixture side.

The internal peripheral signal lines 461 and 462 are conductors coupled between the network interface 320 and the common terminals 401 and 402 of the DPDT switch 400. The internal peripheral signal lines 461 and 462 carry communications to whichever endpoint is selected by the DPDT switch 400.

The control input 490 is the selection input of the DPDT switch 400 and receives a control voltage that determines the routing state of the DPDT switch 400. The control input 490 may be implemented as a digital select pin on a USB switch IC.

The removable-peripheral supply voltage 605 is a fixture-side voltage indicative of presence of the test fixture 430 and provides the input to the biasing network that controls the routing state.

The voltage divider 610 is an example of a "bias network" and "voltage-dividing element". The voltage divider 610 is coupled to the control input 490 and is responsive to the removable-peripheral supply voltage 605 by producing a control voltage that sets a logic state at the control input 490 as a function of the removable-peripheral supply voltage 605. The voltage divider 610 may be implemented using two resistors, optionally with additional filtering or protection elements depending on system requirements.

The resistors 611 and 612 form the voltage divider 610 and establish a divided voltage that is applied to the control input 490. The resistor 611 is coupled to the test fixture supply voltage 605 and the resistor 612 is coupled to ground, such that the resulting divided voltage at their junction sets the logic state at the control input 490. The resistors 611 and 612 may be implemented using standard SMD resistors from common suppliers, with values chosen to satisfy logic thresholds and leakage constraints.

Figure 5:
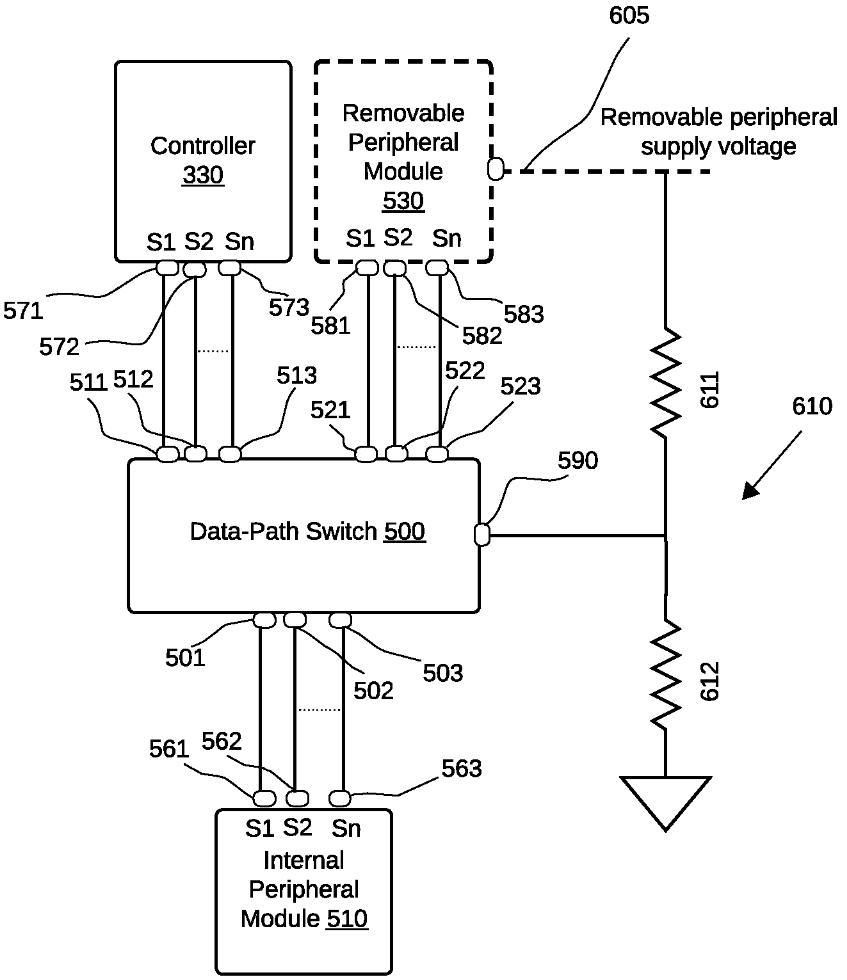
FIG. 5 is a schematic illustrating a switch for routing signal lines between a controller, a removable peripheral module, and an internal peripheral module with voltage divider control.

FIG. 5 depicts a generalized representation of the implementation shown in FIG. 4. The components shown in FIG. 5 include a controller 330, an internal peripheral module 510, a removable peripheral module 530, a data-path switch 500 including common terminals 501, 502, and 503, controller-side terminals 511, 512, and 513, removable-peripheral terminals 521, 522, and 523, and a control input 590, internal peripheral signal terminals 561, 562, and 563, controller signal terminals 571, 572, and 573, removable-peripheral signal terminals 581, 582, and 583, a removable-peripheral supply voltage 605, and a bias network 610 including resistors 611 and 612.

The controller 330 provides control and processing for an electronic device and communicates with an internal peripheral module 510 over controller signal terminals 571, 572, and 573 when the data-path switch 500 selects the controller 330. Inputs to the controller 330 include data received on the controller signal terminals 571, 572, and 573, and outputs include transmitted data on the controller signal terminals 571, 572, and 573 and one or more control signals (not shown in FIG. 5). The controller 330 may be implemented as a microcontroller unit, an application processor, a system-on-chip, or equivalent controller, including commercially available STM32-class MCUs, NXP i.MX processors, or similar embedded controllers.

An internal peripheral module 510 provides a peripheral function and presents internal peripheral signal terminals 561, 562, and 563 that are routed by the data-path switch 500. Inputs to the internal peripheral module 510 include signaling presented at internal peripheral signal terminals 561, 562, and 563 from the selected endpoint, and outputs include peripheral signaling at internal peripheral signal terminals 561, 562, and 563. The internal peripheral module 510 may be implemented as a modem, a serial transceiver, a sensor interface module, or another peripheral subsystem, including commercially available modem modules and interface ICs.

A removable peripheral module 530 provides an external or detachable interface for programming, diagnostics, manufacturing test, or service and is coupled via removable-peripheral signal terminals 581, 582, and 583. Inputs to the removable peripheral module 530 include signaling exchanged with the internal peripheral module 510 through the data-path switch 500, and outputs include a removable-peripheral supply voltage 605 indicative of presence and signaling on removable-peripheral signal terminals 581, 582, and 583. The removable peripheral module 530 may be implemented as a test fixture, programming jig, or service adapter coupled to an external host.

A data-path switch 500 is configured with common terminals 501, 502, and 503 coupled to signal terminals 561, 562, and 563 of the internal peripheral module 510 and further configured to selectively route those signal terminals 561, 562, and 563 to either controller signal terminals 571, 572, and 573 via controller-side terminals 511, 512, and 513 or to removable-peripheral signal terminals 581, 582, and 583 via removable-peripheral terminals 521, 522, and 523. Inputs include the internal peripheral module 510 signaling at signal terminals 561, 562, and 563 and a logic state at the control input 590; outputs include routed signaling at controller signal terminals 571, 572, and 573 or removable-peripheral signal terminals 581, 582, and 583 depending on the logic state at the control input 590. The data-path switch

500 may be implemented as an analog multiplexer or multi-pole multi-throw switch, including a DPDT/3PDT switch for differential pairs and associated control lines, or other high-bandwidth analog switch devices.

A control input 590 provides a selection input for the data-path switch 500 and determines which terminal set is connected to the common terminals 501, 502, and 503. The input to the control input 590 is a bias voltage produced by the bias network 610, and the output effect is the selection state that routes the internal peripheral module 510 signaling to the controller 330 or to the removable peripheral module 530.

A removable-peripheral supply voltage 605 provides a fixture-side presence indication and serves as an input to the bias network 610. Input to the removable-peripheral supply voltage 605 is provided by the removable peripheral module 530, and the output is the voltage level delivered to the bias network 610 that influences the logic state at the control input 590.

A bias network 610 is coupled to the control input 590 and is responsive to the removable-peripheral supply voltage 605. The bias network 610 that sets a logic state at the control input 590 as a function of the removable-peripheral supply voltage 605. Inputs include the removable-peripheral supply voltage 605 and a reference potential at ground; the output is a bias voltage at the control input 590. The bias network 610 may be implemented as a voltage divider using resistors 611 and 612 and may optionally include additional filtering or protection elements.

Resistors 611 and 612 form a voltage divider within the bias network 610. Resistor 611 couples the removable-peripheral supply voltage 605 to a divider node that is coupled to the control input 590, and resistor 612 couples that divider node to ground. Inputs include the removable-peripheral supply voltage 605 and ground; the output is the divided voltage delivered to the control input 590. Resistors 611 and 612 may be implemented as standard SMD resistors selected to meet the input-low and input-high thresholds of the control input 590.

During operation, the removable-peripheral supply voltage 605 provided by the removable peripheral module 530 drives the bias network 610 so that the bias network 610 sets a logic state at the control input 590 as a function of the removable-peripheral supply voltage 605, and the data-path switch 500 routes the signal terminals 561, 562, and 563 of the internal peripheral module 510 to the controller signal terminals 571, 572, and 573 of the controller 330 or to the removable-peripheral signal terminals 581, 582, and 583 of the removable peripheral module 530 according to the logic state at the control input 590.

Figures 6, 7:
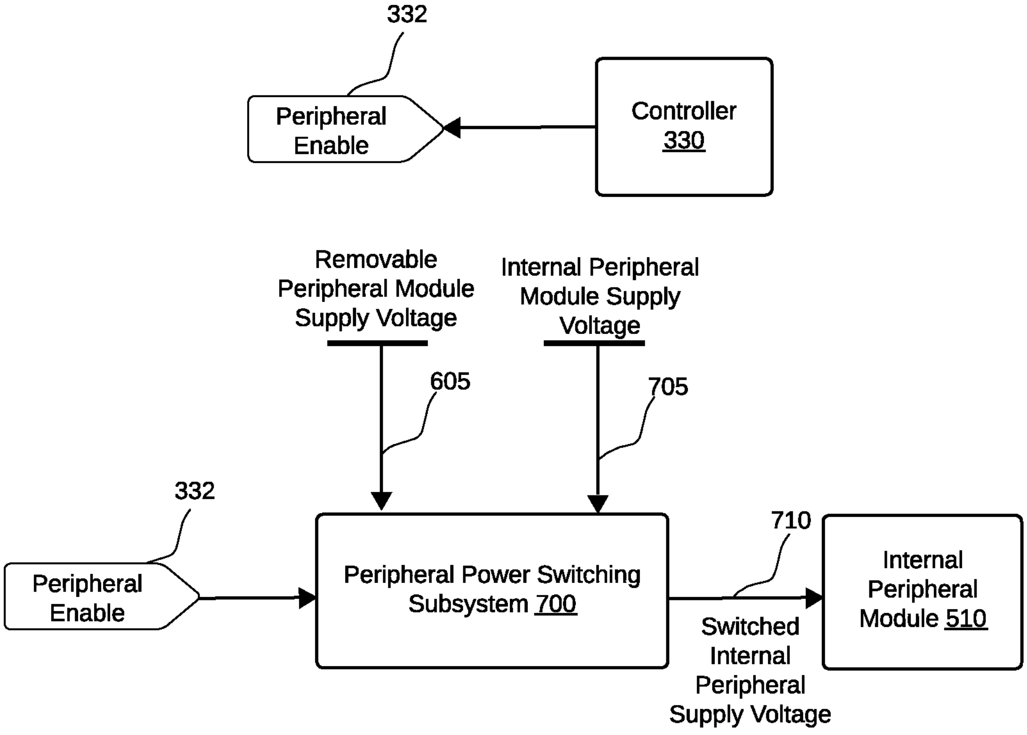
FIG. 6 is a table illustrating the operational states of internal and removable peripheral modules based on peripheral enable and module presence.
FIG. 7 is a system diagram illustrating a peripheral power switching subsystem for managing supply voltages to internal and removable peripheral modules.

FIG. 6 shows a table 600 that concisely maps the operational states of the internal peripheral module 510 and the removable peripheral module 530 based on the peripheral enable signal 332 and the presence indicator 605. The table 600 includes columns for the peripheral enable signal 332, the removable peripheral module presence indicator 605, and the state of the internal peripheral module 705. When the peripheral enable signal 332 is HIGH and the presence indicator 605 is "Not Inserted," the internal peripheral module 510 is ON, enabling consistent device operation. If the presence indicator 605 is "Inserted," the internal peripheral module 510 remains ON regardless of the peripheral enable signal 332, allowing programming or diagnostics via the removable peripheral module 530. When both the peripheral enable signal 332 and the presence indicator 605 are LOW and "Not Inserted," the internal peripheral module 510 is OFF, conserving power. This mapping ensures stable switching and reliable power control, preventing undefined states and supporting seamless transitions between internal and removable modules. The concise logic illustrated in FIG. 6 directly supports the advantages of claim steps related to deterministic control, stable operation, and independent module programming.

FIG. 7 illustrates a peripheral power switching subsystem 700 designed to manage supply voltages for an internal peripheral module 510 and a removable peripheral module 605. The subsystem 700 receives a peripheral enable signal 332 from a controller 330 and a removable peripheral module supply voltage 605 and delivers a switched internal peripheral supply voltage 710 to the internal peripheral module 510. The internal peripheral module supply voltage 705 is supplied to the internal peripheral module 510, whereas the removable peripheral module 605 operates using its own supply voltage.

The peripheral power switching subsystem 700 groups circuitry that determines whether power is delivered to an internal peripheral module 510. Inputs to the peripheral power switching subsystem 700 include the peripheral enable signal 332, the removable peripheral module supply voltage 605, and the internal peripheral supply voltage 705; outputs include the switched internal peripheral supply voltage 710 delivered to the internal peripheral module 510. The peripheral power switching subsystem 700 may be implemented as a functional block on a printed circuit board that contains discrete components and/or integrated power-control devices that cooperate to gate power to the internal peripheral module 510.

The arrangement in FIG. 7 provides the advantage of allowing the internal peripheral module 510 to be powered independently of the controller 330, which enables programming or diagnostics through the removable peripheral module 605 even when the controller 330 is unpowered. The logic network ensures that the load switch only enables power when necessary, conserving energy and improving reliability. This approach also eliminates floating or ambiguous logic states, thereby enhancing system stability and production efficiency.

Figure 8:
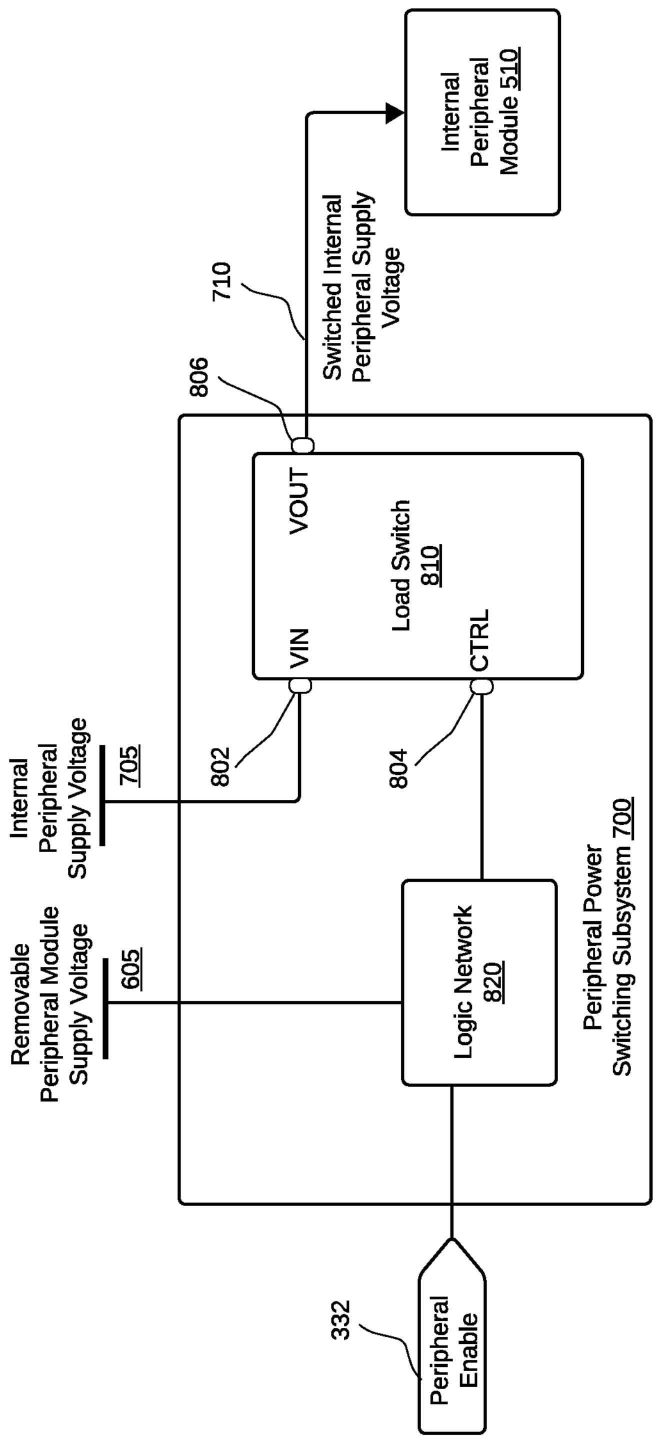
FIG. 8 is a system diagram illustrating a peripheral power switching subsystem with ORing logic and a load switch for supply voltage management.

FIG. 8 shows an implementation of the peripheral power switching subsystem 700 by a load switch and a logic network. The components shown in FIG. 8 include a peripheral enable signal 332, a removable peripheral module supply voltage 605, an internal peripheral supply voltage 705, a logic network 820, a load switch 810 having an input voltage terminal 802, a control input 804, and an output voltage terminal 806, a switched internal peripheral supply voltage 710, and an internal peripheral module 510.

The peripheral enable signal 332 is a controller-originated control signal that requests that the internal peripheral module 510 be powered or enabled. Inputs to the peripheral enable signal 332 may be generated by a microcontroller or application processor; the output of the peripheral enable signal 332 is delivered to the logic network 820 to participate in determining whether the load switch 810 is enabled. The peripheral enable signal 332 may be implemented as a GPIO-level digital signal, a PMIC-controlled enable, or another logic-level control.

The removable peripheral module supply voltage 605 is a voltage indicative of the presence or activity of a removable peripheral module, such as a test fixture. Inputs to the removable peripheral module supply voltage 605 are provided by the removable module or its associated supply; the output is delivered to the logic network 820 to request enabling of the load switch 810 when the removable module is present. The removable peripheral module supply voltage 605 may be implemented as a USB VBUS signal, a fixture-provided supply rail, or another presence-indicating voltage derived from an external connector.

The internal peripheral supply voltage 705 represents an available supply rail used as the source for powering the internal peripheral module 510. Inputs to the internal peripheral supply voltage 705 originate from a device power system; the output is provided to the input voltage terminal 802 of the load switch 810. The internal peripheral supply voltage 705 may be implemented as a regulated rail from a DC-DC converter, an LDO output, or another board-level supply.

The peripheral power switching subsystem 700 includes a load switch 810 that is controlled by a logic network 820 responsive to both the peripheral enable signal 332 and the removable peripheral module supply voltage 605. When either the peripheral enable signal 332 is asserted or the removable peripheral module supply voltage 605 is present, the load switch 810 enables the switched internal peripheral supply voltage 710, ensuring the internal peripheral module 510 is powered for standard operation or for programming and diagnostics via the removable peripheral module 605.

The logic network 820 is a logic network that combines at least two sources to generate a control signal for the load switch 810. Inputs to the logic network 820 include the peripheral enable signal 332 and the removable peripheral module supply voltage 605; the output of the logic network 820 drives the control input 804 of the load switch 810. The logic network 820 may be implemented using discrete components such as a diode-resistor OR arrangement, a transistor network, an analog comparator arrangement, or a digital logic gate, depending on voltage domains and desired isolation.

The load switch 810 is a power-switching device that selectively connects a supply to a load in response to a control signal. Inputs to the load switch 810 include the input voltage at the input voltage terminal 802, and an enable/control signal at the control input 804; the output is the switched supply delivered at the output voltage terminal 806. The load switch 810 may be implemented as an integrated load switch IC or as a discrete MOSFET-based switch with gate control circuitry that provides equivalent enable behavior and inrush control.

The input voltage terminal 802 is the supply input of the load switch 810. Its input is the internal peripheral supply voltage 705; its output is the internal pass element of the load switch 810 that, when enabled via the control input 804, supplies the output voltage terminal 806. The input voltage terminal 802 may be a pin on an integrated load switch or a source node of a discrete pass transistor.

The control input 804 is the control terminal of the load switch 810. Its input is the output of the logic network 820 derived from the peripheral enable signal 332 and the removable peripheral module supply voltage 605; its output effect is to place the load switch 810 into an enabled or disabled state. The control input 804 may be a logic-level enable pin on an integrated load switch or a gate-drive node in a discrete implementation.

The output voltage terminal 806 is the output of the load switch 810. Its input is the switched connection from the input voltage terminal 802 when the load switch 810 is enabled via the control input 804; its output is the switched internal peripheral supply voltage 710 delivered to the internal peripheral module 510. The output voltage terminal 806 may be a pin on an integrated load switch or a drain node of a discrete pass transistor.

The switched internal peripheral supply voltage 710 is the supply delivered to the internal peripheral module 510 when the load switch 810 is enabled. Its input is the output voltage terminal 806; its output is a powered rail presented to the internal peripheral module 510. The switched internal peripheral supply voltage 710 may be used to power the internal peripheral module 510 directly or to drive an enable/presence pin of the internal peripheral module 510.

The internal peripheral module 510 is a functional subsystem within the electronic device that is intended to be powered or enabled under control of the peripheral power switching subsystem 700. Its input is the switched internal peripheral supply voltage 710; its outputs include the peripheral functionality provided by the internal peripheral module 510, such as communications, sensing, or interface signaling. The internal peripheral module 510 may be implemented as a modem module, a transceiver, a sensor interface, or another peripheral subsystem.

During operation, the logic network 820 asserts the control input 804 of the load switch 810 in response to at least two sources, including the peripheral enable signal 332 and the removable peripheral module supply voltage 605, and the load switch 810 passes the internal peripheral supply voltage 705 from the input voltage terminal 802 to the output voltage terminal 806 to generate the switched internal peripheral supply voltage 710 for the internal peripheral module 510. In this way, the internal peripheral module 510 can be powered during normal device operation in response to the peripheral enable signal 332 and can also be powered for programming or diagnostics when the removable peripheral module supply voltage 605 indicates presence of the removable module, without requiring that the controller remain fully powered.

Figure 9:
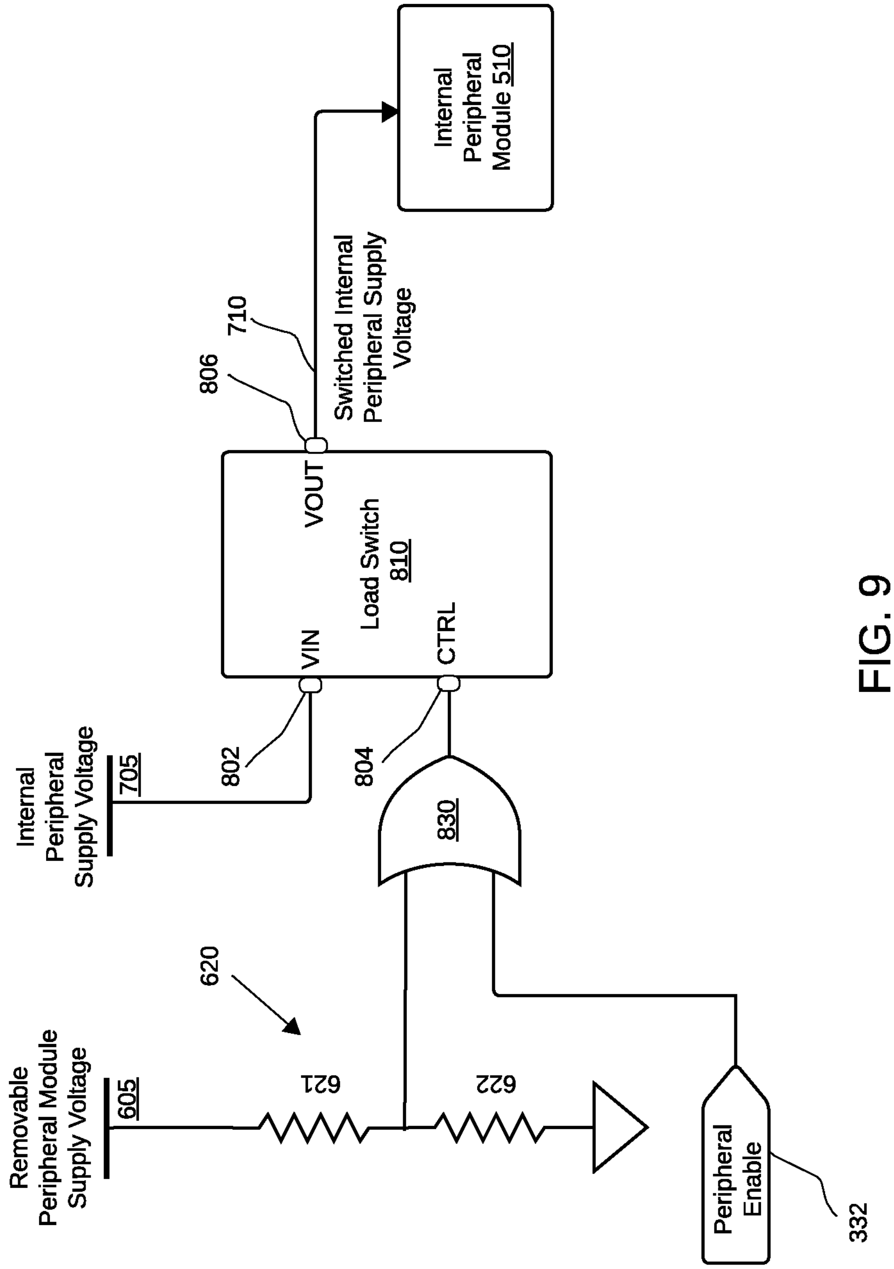
FIG. 9 is a circuit diagram illustrating a load switch and OR gate configuration for supplying power to a peripheral module.

FIG. 9 illustrates an implementation of FIG. 8 in which the logic network 820 is implemented using a voltage divider 620 and an OR gate 830.

The voltage divider 620 is a resistive network coupled between the removable peripheral module supply voltage 605 and a reference potential (e.g., ground) to generate a scaled logic-level signal suitable for logic processing. The voltage divider 620 includes a top resistor 621 coupled to the removable peripheral module supply voltage 605 and a bottom resistor 622 coupled to the reference potential, with a center node providing a divided voltage. Inputs include the removable peripheral module supply voltage 605 and the reference potential; the output is the divided voltage at the center node, which represents a presence-indicative logic level for the removable peripheral module. The voltage divider 620 may be implemented using discrete resistors selected to satisfy the logic thresholds of downstream circuitry and to limit current draw and may optionally include filtering or protection elements.

The top resistor 621 is coupled between the removable peripheral module supply voltage 605 and the divider center node. Its function is to provide a pull toward the removable peripheral module supply voltage 605 that, in combination with the bottom resistor 622, establishes the divided voltage representing fixture presence. The input is the removable peripheral module supply voltage 605; the output effect is contribution to the divider center-node voltage. The resistor 621 may be implemented as a standard SMD resistor.

The bottom resistor 622 is coupled between the divider center node and the reference potential. Its function is to pull the divider center node toward the reference potential when the removable peripheral module supply voltage 605 is absent and to set the division ratio together with the top resistor 621 when the removable peripheral module supply voltage 605 is present. The input is the divider center node; the output effect is the defined center-node voltage relative to the reference potential. The resistor 622 may be implemented as a standard SMD resistor.

The OR gate 830 is a logic element that combines at least two input signals to generate an enable/control signal for the load switch. One input to the OR gate 830 is the divided voltage produced by the voltage divider 620 (representing presence of the removable peripheral module). Another input is the peripheral enable signal 332 (representing a controller-side request). The output of the OR gate 830 is a logic-level control signal that asserts when either input is asserted, thereby driving the load switch control input. The OR gate 830 may be implemented as a discrete logic IC (e.g., a single-gate CMOS OR), as an equivalent transistor/diode logic network, or as logic embedded within a controller or programmable logic device.

During operation, the voltage divider 620 converts the removable peripheral module supply voltage 605 into a logic-compatible presence signal at its center node, and the OR gate 830 combines that presence signal with the peripheral enable signal 332. When either the removable peripheral module supply voltage 605 indicates presence or the peripheral enable signal 332 is asserted, the OR gate 830 asserts its output to enable the load switch, thereby implementing the "logic network 820" behavior of FIG. 8 using explicit divider-and-gate circuitry.

Figure 10:
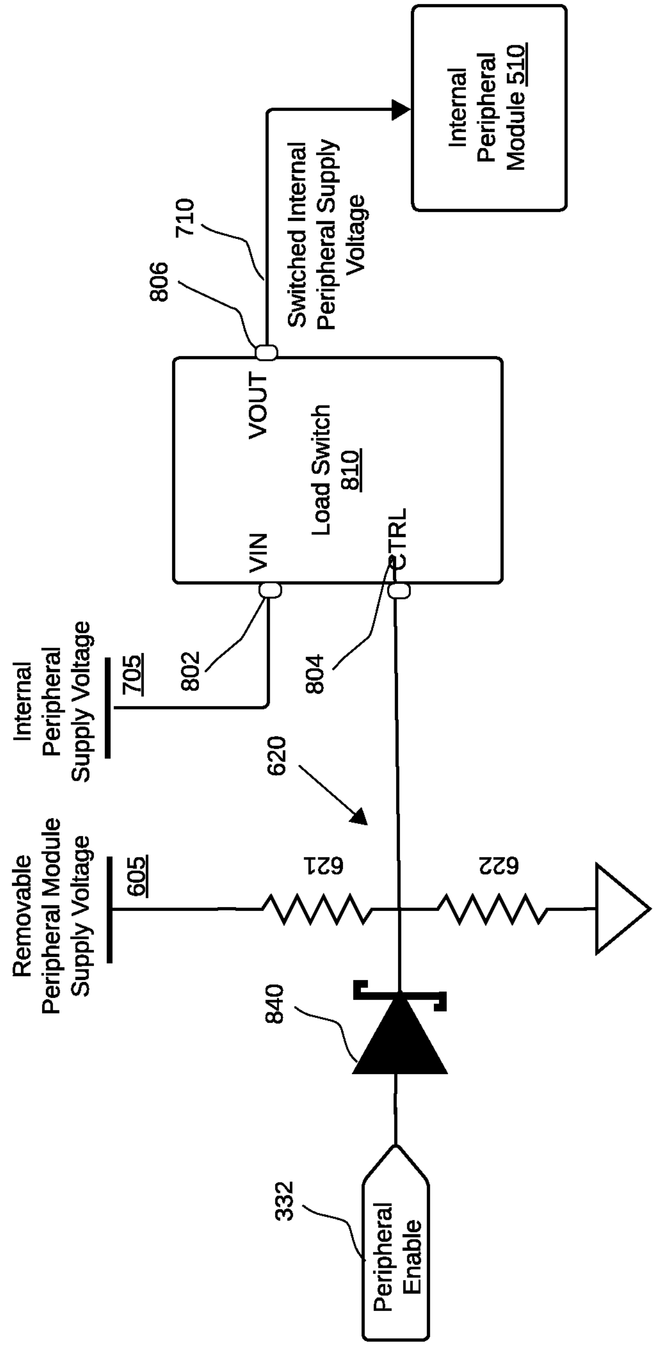
FIG. 10 is a schematic illustrating a peripheral module supply circuit with a load switch, voltage divider, and Schottky diode for stable power control.

FIG. 10 illustrates an implementation of FIG. 8 in which the logic network 820 is implemented using the voltage divider 620 and a Schottky diode 840.

The Schottky diode 840 is a one-way isolation element that couples the peripheral enable signal 332 to a control node that drives the load switch control input while limiting reverse current flow toward the peripheral enable signal 332. In a typical orientation, the Schottky diode 840 is forward-biased when the peripheral enable signal 332 is asserted so that the peripheral enable signal 332 can raise the control node to a logic-high level sufficient to enable the load switch. When the removable peripheral module supply voltage 605 is present and drives the control node via the voltage divider 620, the Schottky diode 840 blocks or substantially limits current from the control node into the peripheral enable signal 332 path, thereby reducing back feeding into a controller domain. The Schottky diode 840 may be implemented using a low-forward-voltage signal diode, such as RB751S40, BAT54-class devices, or other Schottky diodes suitable for logic coupling and low leakage.

The links in FIG. 10 connect the removable peripheral module supply voltage 605 to the voltage divider 620, connect the center node of the voltage divider 620 to the load switch control input, and connect the peripheral enable signal 332 to the same control node through the Schottky diode 840.

During operation, the voltage divider 620 drives the control node to enable the load switch when the removable peripheral module supply voltage 605 indicates presence of the removable module. Independently, when the peripheral enable signal 332 is asserted, the Schottky diode 840 forward-biases to drive the control node high and enable the load switch even when the removable peripheral module supply voltage 605 is absent, while the diode 840 prevents current sourced from the removable peripheral module supply voltage 605 from back feeding into the peripheral enable signal 332 path.

Figure 11:
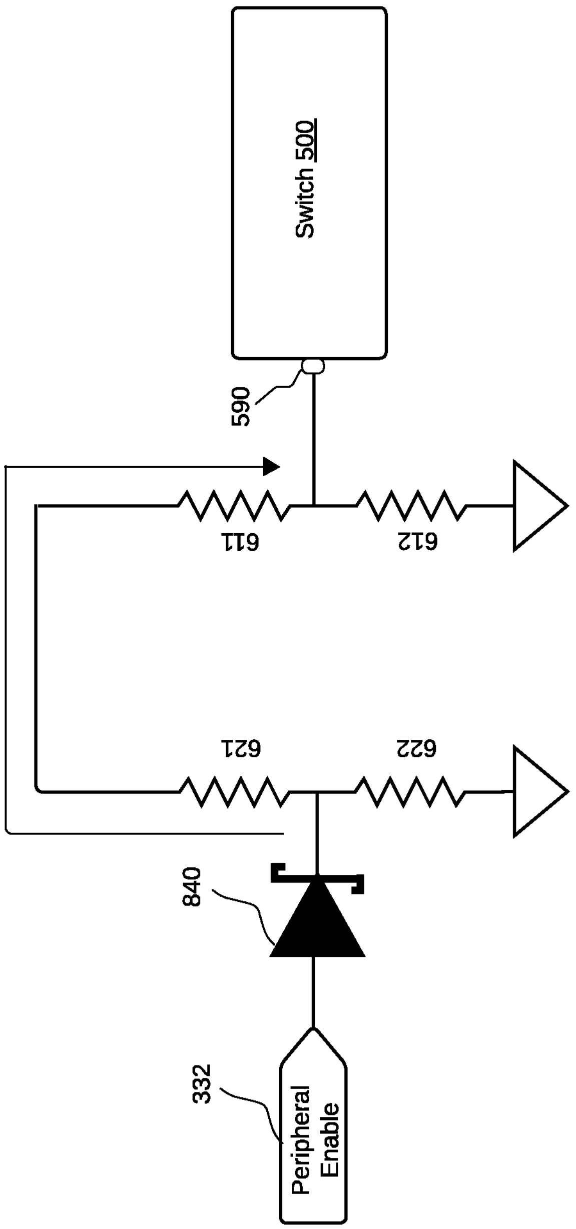
FIG. 11 is a circuit diagram illustrating a Schottky diode, resistors, and switch configuration for peripheral enable signal routing.

In FIG. 11, the Schottky diode 840 is used to couple the peripheral enable signal 332 (for example, about 3.3 V) onto the control node with a modest forward drop (for example, about 0.2-0.4 V), so the control node can rise to roughly 2.9-3.1 V when the removable-peripheral supply is absent. The key design point is that the diode 840 should have a sufficiently low forward drop at the relevant current so that the resulting control node voltage remains capable of producing the intended logic level downstream.

Resistors 621 and 622 form a divider (or bias network) on the diode-driven control node and are selected to be relatively high impedance so that the node is not excessively loaded and remains near the diode-driven level when the peripheral enable signal 332 is asserted. For example, each of 621 and 622 may be in a high-value range such as about 100 kΩ to 2 MΩ (often several hundred kΩ to about 1 MΩ), with the ratio chosen to keep the node in a valid logic state when driven through the diode 840 and to provide a deterministic pull toward ground when not driven.

Resistors 611 and 612 form the divider that drives the switch control input 590 and must be chosen to force the control input 590 into a valid logic state in the corner case where the removable-peripheral supply is absent, but the peripheral enable signal 332 is asserted. In general, 611 should be relatively high compared to 612 when you need to keep the control input 590 from being pulled upward into a mid-rail region; conversely, 611 should be relatively low compared to 612 when you need the control input 590 to be driven high from the diode-driven node. Example ranges for 611 and 612 are again high-impedance values such as about 100 kΩ to 2 MΩ, but the critical requirement is the ratio: it is selected so that the resulting voltage at 590 is either held below the input-low threshold or raised to at least the input-high threshold (as required by the intended routing behavior), despite the diode drop and leakage paths.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

The invention claimed is:

1. A circuit for sharing an internal peripheral module of an electronic device between a controller and a removable peripheral module, the circuit comprising:

a data-path switch having a control input and at least two switch paths for signal lines, the data-path switch configured with common terminals coupled to signal lines of the internal peripheral module and further configured to selectively route the signal lines of the internal peripheral module to either controller data lines or removable-peripheral data lines, wherein the control input of the data-path switch is coupled to a bias network that sets a logic state at the control input as a function of a removable-peripheral supply voltage, and wherein the data-path switch routes the signal lines of the internal peripheral module to the controller or to the removable peripheral module according to the logic state at the control input; and a peripheral power switching subsystem comprising a load switch having an input terminal coupled to a voltage supply, an output terminal coupled to a switched internal peripheral supply voltage, and a control terminal, wherein the control terminal of the load switch is coupled to a logic network responsive to at least two sources including the removable-peripheral supply voltage and a controller-side peripheral enable signal such that the load switch presents the voltage supply at the output terminal when at least one of (i) the controller-side peripheral enable signal is asserted or (ii) the removable-peripheral supply voltage is above a threshold indicative of presence of the removable peripheral module.

2. The circuit of claim 1, wherein the data-path switch further comprises a first set of throw terminals coupled to the controller data lines and a second set of throw terminals coupled to the removable-peripheral data lines, and wherein the data-path switch is configured to concurrently connect the common terminals to one of the first set of throw terminals or the second set of throw terminals.

3. The circuit of claim 1, wherein the bias network comprises a voltage divider connected between the removable-peripheral supply voltage and ground, a center node of the voltage divider being coupled to the control input of the data-path switch to set the logic state at the control input.

4. The circuit of claim 3, wherein a resistance ratio of the voltage divider is selected to maintain the control input below an input-low threshold when the removable-peripheral supply voltage is absent, and the controller-side peripheral enable signal is asserted.

5. The circuit of claim 1, wherein the logic network comprises a one-way isolation element coupling the controller-side peripheral enable signal to the control terminal and a resistor coupling the removable-peripheral supply voltage to the control terminal.

6. The circuit of claim 5, wherein the one-way isolation element comprises a Schottky diode configured to prevent reverse current from the removable-peripheral supply voltage toward a controller domain.

7. The circuit of claim 5, wherein the resistor coupling the removable-peripheral supply voltage to the control terminal has a resistance between 100 kilohms and 2 megohms to limit leakage while maintaining a valid logic-high at the control terminal.

8. The circuit of claim 1, wherein, in an absence of the removable-peripheral supply voltage, the bias network sets a logic state at the control input corresponding to a default state in which the data-path switch routes the signal lines of the internal peripheral module to the controller.

9. The circuit of claim 1, wherein, when the removable-peripheral supply voltage is above the threshold indicative of presence of the removable peripheral module, the data-path switch disconnects the controller data lines from the signal lines of the internal peripheral module while routing the signal lines of the internal peripheral module to the removable-peripheral data lines.

10. The circuit of claim 1, wherein the bias network and the logic network implement a state behavior in which:

when the removable-peripheral supply voltage is above the threshold indicative of presence of the removable peripheral module, the data-path switch routes the signal lines of the internal peripheral module to the removable-peripheral data lines; when the removable-peripheral supply voltage is below the threshold, the data-path switch routes the signal lines of the internal peripheral module to the controller data lines; and the load switch presents the voltage supply at the output terminal when at least one of (i) the controller-side peripheral enable signal is asserted or (ii) the removable-peripheral supply voltage is above the threshold indicative of presence of the removable peripheral module.

11. The circuit of claim 1, wherein the internal peripheral module comprises a USB module and the signal lines comprise USB differential data lines D+ and D−, and the removable-peripheral supply voltage comprises a fixture-side USB voltage bus.

* * * * *